UNITED STATES PATENT OFFICE.

C. F. THOMIN AND C. STUMER, OF CINCINNATI, OHIO.

IMPROVEMENT IN PROCESSES FOR ENAMELING IRON.

Specification forming part of Letters Patent No. 11,815, dated October 17, 1854.

*To all whom it may concern:*

Be it known that we, CONRAD F. THOMIN and CHARLES STUMER, of Cincinnati, Ohio, have made new and useful Improvements in the Process of Enameling; and we do hereby declare the following to be a clear and exact description thereof.

A difficulty occurs in enameling surfaces liable to contract and expand unequally by heat, or such as expand to an extent which throws them out of shape, owing to the enamel becoming detached from its intimate connection with the surface of the metal; and the object of our improvement is to avoid this, and also to secure a more even coating of enamel at a less expense of trouble and manipulation.

It is usual in enameling cast-iron to mix the several materials of which the enamel is to be composed, fuse them, and when cooled pulverize and grind them into a thin paste with water. This is flooded or spread over the metallic surface and treated in a muffler to a temperature sufficient to vitrify the frit.

Sheet-iron does not maintain its shape, but becomes cockled by the heat necessary to the process, and hence a difficulty arises. As the enamel attains a certain degree of rigidity by the evaporation of the water or other medium of flotation, the metal wrinkles and the enamel does not adhere with sufficient tenacity to follow it.

Our process is as follows: After cleaning the metallic surface—say, for instance, a sheet-iron pan—we apply a solution of gum over the surface to be enameled. For this purpose many gums or combinations of gums may be suitable. We use gum-tragacanth, but do not limit ourselves to this. Upon this solution of gum or mucilage we sift or otherwise finely distribute the pulverized frit, which, after having been compounded and fused, has been ground to a fine powder. This done, we lay the pan aside for a time—say an hour or two—to allow the moisture to evaporate somewhat and the powdered frit to insinuate itself into the mucilage. The pan is then placed in the muffler and heated to redness, vitrifying the frit, producing an enamel coating perfectly adhering to the metal in every part to which it has been applied.

We do not claim applying the powdered frit to a previous coating of enamel-paste while the latter is moist, such a process having been long in use; but

What we claim as new, and for which we desire to obtain Letters Patent, is—

Treating the cleansed surface of the sheet or wrought metal to be enameled with a mucilage or viscid solution and powdering or otherwise evenly distributing the pulverized frit thereon.

In testimony whereof we hereunto set our hands before two subscribing witnesses.

CONRAD F. THOMIN.
    CHARLES STUMER.

Witnesses:
 EDWARD HALL KNIGHT,
 THOS. W. SCOTT.